(No Model.)
W. & W. A. WILCOX.
COUPLING.
No. 407,046. Patented July 16, 1889.
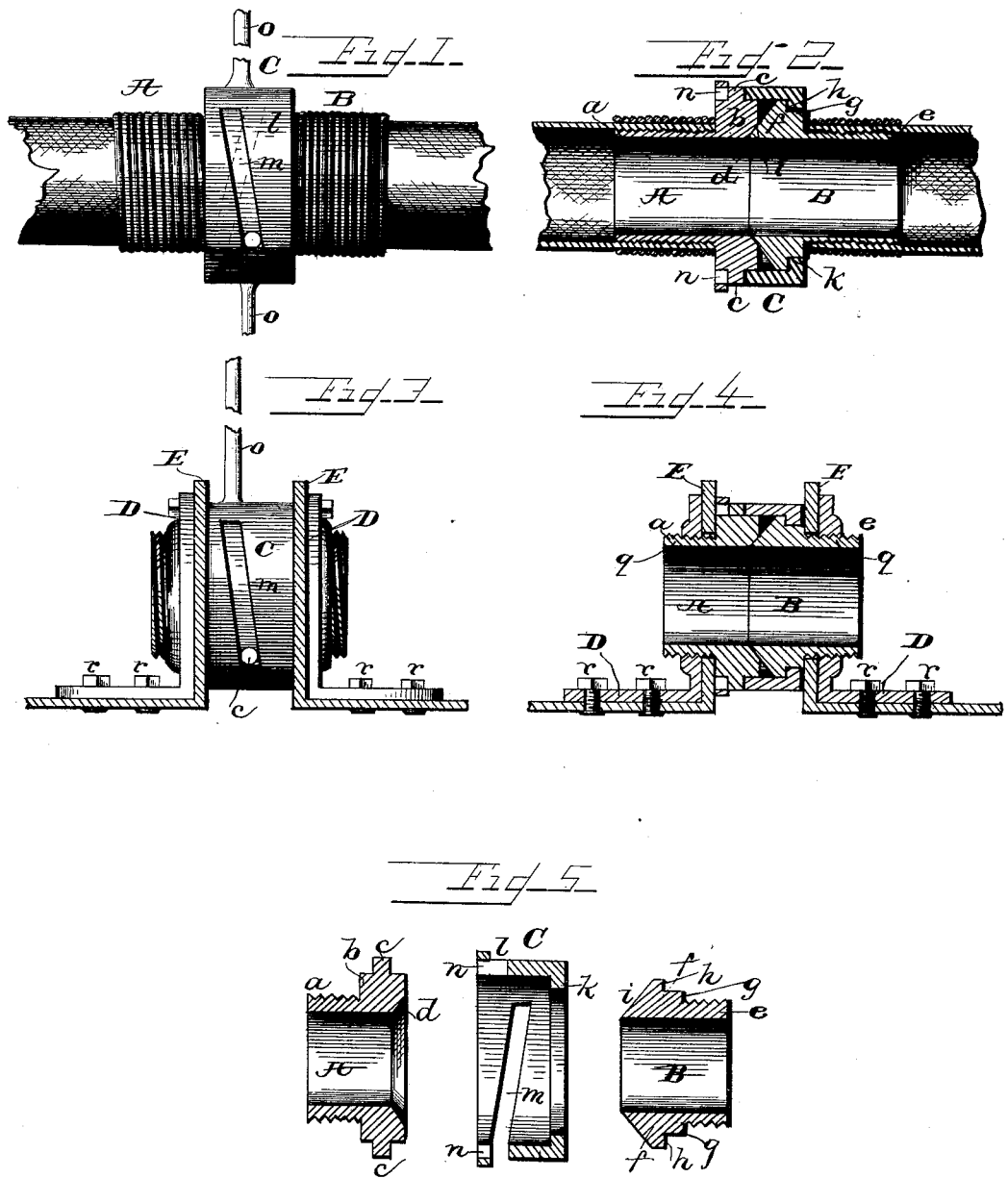
Witnesses
G. A. Tauberschmidt
L. B. Whitaker
Inventor
Wm. Wilcox
Wm. A. Wilcox
By their Attorneys
Johnston, Reinohl & Dyre

# UNITED STATES PATENT OFFICE.

WILLIAM WILCOX AND WILLIAM ALARIC WILCOX, OF GRAND RAPIDS, MICHIGAN.

COUPLING.

SPECIFICATION forming part of Letters Patent No. 407,046, dated July 16, 1889.

Application filed February 26, 1889. Serial No. 301,282. (No model.)

*To all whom it may concern:*

Be it known that we, WILLIAM WILCOX and WILLIAM ALARIC WILCOX, citizens of the United States, residing at Grand Rapids, in the county of Kent and State of Michigan, have invented certain new and useful Improvements in Couplings; and we do hereby declare the following to be a full, clear, and exact description of the invention, such as will enable others skilled in the art to which it appertains to make and use the same.

Our invention relates to couplings, and has for its object an improvement of couplings in common use.

The invention will be hereinafter described, and particularly pointed out in the claims.

In the accompanying drawings, which form part of this specification, Figure 1 represents a side elevation of our improved coupling applied to hose; Fig. 2, a longitudinal section thereof; Fig. 3, a side elevation showing a coupling attached to the sides or ends of two pans; Fig. 4, a longitudinal section of the same, and Fig. 5 a detail vertical longitudinal section of the three parts which constitute the coupling.

Reference being had to the drawings and the letters thereon, A and B indicate the two sections or members of the coupling, and C the sleeve which unites them. The section A is provided with a screw-threaded extension $a$, an enlargement $b$, studs $c$, and a seat $d$ in the front end of the section. The section B is provided with a screw-threaded extension $e$, an enlargement $f$ having a smooth portion $g$ in the rear of the shoulder $h$, and an angular projection $i$ on the front end, which corresponds with the seat $d$ in the section A, and when the two are brought together form an absolutely tight joint without the use of packing. The seat $d$ and the angular projection $i$ are turned off in a lathe.

The sleeve C is provided with an inwardly-projecting flange $k$, which engages with the shoulder $h$ and the portion $g$ in the rear thereof on the section B, angular slots $l$ $m$, which engage with the studs $c$ on the section A, grooves $n$ for the studs $c$ to enter the slots $l$ $m$, and a handle or lever or levers $o$ for revolving the sleeve and drawing the sections A B together.

The coupling may be used on hose, as shown in Figs. 1 and 2, or it may be used to unite two pans, vats, or other vessels, as shown in Figs. 3 and 4. When used for the latter purpose, the sections may be screwed into the wall thereof, if the wall is of sufficient thickness to enable the screw-thread to take therein. We prefer to use metal brackets D, which are secured to the inside of the wall, side, or end $p$ of a pan or vat E. The brackets are provided with a screw-threaded aperture $q$, with which the rear extensions $a$ or $e$ of the sections of the coupling engage, and are secured to the bottom and side of the pan by rivets or bolts $r$, or in any approved manner.

To form a union between two sections of hose or two pans, the parts are brought together by inserting the inner or front end of the section A in the sleeve C by passing the studs $c$ through the grooves $n$ into the angular slots $l$ $m$, when the sleeve is turned by the lever $o$ and the members $i$ and $d$ seated. To uncouple, the reverse action of the parts is effected.

The coupling embodies only three pieces, and is cheap and durable, without the liability of any of the parts becoming lost when the sections are disengaged, as the sleeve is secured to the section B by the flange $k$, which is held between the shoulder $h$ and the wall of the pan or vat.

Having thus fully described our invention, what we claim is—

1. A coupling consisting of sections A B, having screw-threaded extensions at one end, and a fluid-joint at the opposite ends, and a sleeve engaging with both of said sections, in combination with brackets having screw-threaded apertures with which the extensions of the coupling-sections engage, substantially as described.

2. A coupling consisting of a section B, having an enlargement or head, as $f$, a seat, as $g$, shoulders, as $h$, a tubular extension at one end and a conical projection, as $i$, at the opposite end, a counter-section A, having a head, as $b$, a conical seat, as $d$, in said head, and studs $c$ on the periphery of the head $b$, in combination with brackets, as D, provided with screw-threaded apertures, and a sleeve, as C, having a flange, as $k$, adapted to the seat $g$, and shoulder $h$ on the section B, and angular grooves $m$ to receive the studs $c$ on the section A, substantially as described.

In testimony whereof we affix our signatures in presence of two witnesses.

WILLIAM WILCOX.
WILLIAM ALARIC WILCOX.

Witnesses:
GEO. SNYDER,
C. W. YATES.